US008891783B2

(12) United States Patent
Tan et al.

(10) Patent No.: US 8,891,783 B2
(45) Date of Patent: Nov. 18, 2014

(54) DIRECTIONAL SOUND SYSTEM

(75) Inventors: Ee Leng Tan, Singapore (SG); Woon Seng Gan, Singapore (SG)

(73) Assignee: Nanyang Technological University, Singapore (SG)

( * ) Notice: Subject to any disclaimer, the term of this patent is extended or adjusted under 35 U.S.C. 154(b) by 395 days.

(21) Appl. No.: 13/391,000

(22) PCT Filed: Aug. 25, 2010

(86) PCT No.: PCT/SG2010/000312
§ 371 (c)(1),
(2), (4) Date: Feb. 17, 2012

(87) PCT Pub. No.: WO2011/025461
PCT Pub. Date: Mar. 3, 2011

(65) Prior Publication Data

US 2012/0148053 A1 Jun. 14, 2012

Related U.S. Application Data

(60) Provisional application No. 61/236,687, filed on Aug. 25, 2009.

(51) Int. Cl.
*H04B 3/00* (2006.01)
*G10K 15/02* (2006.01)
*H04R 1/40* (2006.01)
*H04R 3/04* (2006.01)

(52) U.S. Cl.
CPC ................ *G10K 15/02* (2013.01); *H04R 1/403* (2013.01); *H04R 3/04* (2013.01); *H04R 2217/03* (2013.01); *H04R 2430/03* (2013.01)
USPC ................................ 381/77; 381/79; 381/103

(58) Field of Classification Search
CPC ............... H04B 3/00; H04B 5/00; H03G 5/00
USPC ................... 381/77, 82, 111, 79, 103; 700/94
See application file for complete search history.

(56) References Cited

U.S. PATENT DOCUMENTS 6,445,804 B1 * 9/2002 Hirayanagi .................. 381/303
7,146,011 B2 * 12/2006 Yang et al. ...................... 381/77
(Continued)

FOREIGN PATENT DOCUMENTS

WO 01/52437 7/2001
WO 2004/019653 3/2004

OTHER PUBLICATIONS

Written Opinion for International Application PCT/SG2010/000312, completed Sep. 17, 2010, 4 pgs.

(Continued)

*Primary Examiner* — Disler Paul
(74) *Attorney, Agent, or Firm* — KPPB LLP

(57) ABSTRACT

A directional sound system is disclosed. The directional sound system (400) comprises a plurality of equalization stages (404, 406) configured to equalize an input signal; and a transducer stage (412) configured to transmit the equalized input signal; wherein the plurality of equalization stages (404, 406) comprises a first equalization stage (404) configured to employ an approximated model of the transducer stage (412) and a second equalization stage (406) configured to compensate for differences between the approximated model of the transducer stage (412) and an actual model of the transducer stage (412).

20 Claims, 8 Drawing Sheets

(56) References Cited

U.S. PATENT DOCUMENTS

| | | | | |
|---|---|---|---|---|
| 7,773,761 | B2 * | 8/2010 | Sun et al. | 381/77 |
| 2002/0111795 | A1 | 8/2002 | Norris et al. | |
| 2003/0091203 | A1 * | 5/2003 | Croft et al. | 381/111 |
| 2004/0264707 | A1 * | 12/2004 | Yang et al. | 381/77 |
| 2005/0152561 | A1 * | 7/2005 | Spencer | 381/77 |
| 2007/0121968 | A1 | 5/2007 | Na | |
| 2007/0286433 | A1 | 12/2007 | Yoshino | |
| 2008/0063214 | A1 | 3/2008 | Spencer et al. | |

OTHER PUBLICATIONS

European Supplementary Search Report for Application No. 10812417.3, search completed Aug. 25, 2014, 6 pgs.

International Preliminary Report on Patentability for PCT Application No. PCT/SG2010/000312, International Filing Date Aug. 25, 2010, Report Completed Feb. 28, 2012, 5 pgs.

International Search Report for PCT Application No. PCT/SG2010/000312, International Filing Date Aug. 25, 2010, Completed Sep. 17, 2010, Mailed Sep. 24, 2010, 5 pgs.

* cited by examiner

DIRECTIONAL SOUND SYSTEM

CROSS-REFERENCE TO RELATED APPLICATIONS

The present invention claims priority under 35 U.S.C. §§365 and 119 of Patent Cooperation Treaty International Application No. PCT/SG2010/000312 filed Aug. 25, 2010 and under 35 U.S.C. §119 to U.S. Provisional Patent Application Ser. No. 61/236,687 filed Aug. 25, 2009.

TECHNICAL FIELD

This invention relates to a directional sound system and a method for processing an input signal to a directional sound system.

BACKGROUND

The ability to control sound radiation patterns in entertainment, gaming, communication and personal messaging is becoming an important differentiating feature in many commercial products. A common aim in these systems is to create a highly-directional sound field to targeted audiences by forming a tune-in zone (or personal audio) for a group of people. There are several ways to generate the directional sound field. These include (i) using a sound dome that projects sound to a convex surface to focus sound waves to the listeners below the sound dome; (ii) using a loudspeaker array with the phase-amplitude differences between different loudspeakers adjusted to spatially steer an audible sound beam in a horizontal plane; and (iii) modulating an audible sound signal onto an ultrasonic carrier signal and projecting the modulated signal via special types of ultrasonic emitters to generate a parametric array through the air in such a way that audible sound can travel in a column of sound beam. Loudspeakers generating the directional sound field using (iii) are commonly called parametric (or ultrasonic) loudspeakers. The parametric loudspeaker is based on a nonlinear acoustics property (known as the parametric array effect in air) that uses ultrasound signal to carry the audible sound signal in a tight beam, just like an audio spotlight.

When using a loudspeaker array (as described in (ii)) to steer an audible sound beam at low frequencies, for example, at frequencies less than 200 Hz, the dimension of the loudspeaker array must be significantly greater than the audio wavelength in order to achieve a good directivity. Usually, this means that the dimension of the loudspeaker array must be more than a meter in diameter. This approach of creating a focused sound beam hence incurs a high cost since a large loudspeaker array is required. In contrast, a parametric loudspeaker (as described in (iii)) is able to generate a highly-directional sound beam for a low-frequency sound wave whose wavelength is much larger than the loudspeaker diameter. This is because the small-sized ultrasonic emitter in the parametric loudspeaker is able to produce a highly-directional sound beam without using a vibrating cone as opposed to conventional loudspeakers.

FIG. 1 illustrates a parametric loudspeaker according to the prior art. In the parametric loudspeaker, an ultrasonic carrier signal is first modulated by a modulating input signal which is in the form of an audible sound signal. Preprocessing and modulation units are used to generate the modulated signal. The modulated signal is then passed to an amplifier that drives the ultrasonic emitter to project the modulated signal through a transmission medium (usually air). As the modulated signal is radiated into the transmission medium, it interacts with the transmission medium and self-demodulates to generate a tight column of audible signal. An audible sound beam is thus generated in the transmission medium through a column of virtual audible sources as shown in FIG. 1. This column of virtual audible sources forms an end-fire array of audible sources (referred to as a parametric array) that add up in phase along the propagation axis.

The Berktay far-field model is widely used to approximate the nonlinear sound propagation by the parametric loudspeaker through the transmission medium. This model uses an expression as shown in Equation (1) to predict the far field array response of the parametric loudspeaker. According to Equation (1), the demodulated signal (or audible difference frequency) pressure $p_2(t)$ along the axis of propagation is proportional to the second time-derivative of the square of the envelope of the modulated signal when amplitude modulation is used. In Equation (1), $\beta$ is the coefficient of nonlinearity, $P_0$ is the primary wave pressure, a is the radius of the ultrasonic emitter, $\rho_o$ is the density of the transmission medium, $c_0$ is the small signal sound speed, z is the axial distance from the ultrasonic emitter, $\alpha_0$ is the attenuation coefficient at the source frequency and E(t) is the envelope of the modulated signal.

$$p_2(t) \approx \frac{\beta P_0^2 a^2}{16\rho_0 c_0^4 z\alpha_0}\frac{d^2}{dt^2}E^2(t) \propto \frac{d^2}{d\tau^2}E^2(t) \tag{1}$$

As shown in Equation (1), the nonlinear sound propagation results in a distortion in the demodulated signal. This in turn results in a distortion in the audible signal generated by the parametric loudspeaker, hence affecting the performance of the parametric loudspeaker. Furthermore, the current parametric loudspeaker technology is severely limited by the technological constraints of ultrasonic emitters. One such technological constraint is the small usable low-frequency bandwidth of the ultrasonic emitters.

Digital signal processing techniques have previously been proposed to overcome the technological limitations of the parametric loudspeaker technology. These techniques usually involve pre-processing algorithms which can be programmed in a digital signal processor to enhance, equalize and compensate for any distortion in the audio quality of the signal before sending the processed signal to the ultrasonic emitter. Examples of such techniques are described below.

FIG. 2 shows an adaptive parametric loudspeaker system 200 proposed in U.S. patent application Ser. No. 11/558,489 "Ultra directional speaker system and signal processing method thereof" (hereinafter, Kyungmin). Kyungmin proposes adaptively applying pre-distortion compensation to the modulating signal x(t) (i.e. the input audible signal). Furthermore, instead of using a double sided amplitude modulation (DSBAM) scheme typically used in parametric loudspeaker systems, Kyungmin proposes the use of vestigial sideband modulation (VSB) to overcome the non-ideal filtering of one of the sidebands in single sideband (SSB) modulation.

As shown in FIG. 2, the adaptive parametric loudspeaker system 200 comprises $1^{st}$ and $2^{nd}$ envelop calculators 202, 204 which calculate the envelops $E_1(t)$ and $E_2(t)$ respectively. These envelop calculators 202, 204 are injected with signals at the baseband. The adaptive parametric loudspeaker system 200 also comprises a square root operator 206 which computes the "ideal" envelop $\sqrt{E_1(t)}$ predicted using the Berktay's approximation (i.e. Equation (1)). The difference between $\sqrt{E_1(t)}$ and $E_2(t)$ is then used to train the pre-distortion adaptive filter 208 using the least mean square (LMS) scheme. The coefficients $a_m$ of the adaptive filter 208 are obtained using Equations (2) and (3) as follows wherein β is an adaptive coefficient.

$$a'_m(t) = -2(\sqrt{E_1(t)} - E_2(t)) \times (t-m) \tag{2}$$

$$a_m(t+1) = a_m(t) + \beta a'_m(t) \tag{3}$$

The output 40 of the adaptive filter 208 is shown in Equation (4) as follows.

$$x'(t) = \sum_{m=0}^{N-1} a_m(t) \times (t-m) \tag{4}$$

A pre-processing technique is also proposed in U.S. Pat. No. 6,584,205 (hereinafter, Croft) to improve the performance of parametric loudspeakers. FIG. 3 illustrates a parametric loudspeaker system 300 proposed in Croft. Croft proposed the use of SSB modulation as it offers the same ideal linearity as characterized by square rooting a pre-processed DSBAM modulated signal. Croft further proposed compensating for the distortion inherent in SSB signals using a multi-order distortion compensator. The multi-order distortion compensator comprises a cascade of distortion compensators (Distortion compensator 0 . . . N−1 as shown in FIG. 3) whereby a pre-distorted signal (for example, $x_1(t)$) from one distortion compensator is used as the input to the next distortion compensator in the cascade and so on, until the desired order is reached. Each distortion compensator of Croft comprises a SSB modulator 302 which employs a conventional SSB modulation technique. Similar to Kyungmin, the non-linear models 304 shown in FIG. 3 are based on Berktay's approximation (i.e. Equation (1)) and the system 300 proposed in Croft is based on a feed forward structure found in the multi-order distortion compensator.

SUMMARY

According to an exemplary aspect, there is provided a directional sound system comprising: a plurality of equalization stages configured to equalize an input signal; and a transducer stage configured to transmit the equalized input signal; wherein the plurality of equalization stages comprises a first equalization stage configured to employ an approximated model of the transducer stage and a second equalization stage configured to compensate for differences between the approximated model of the transducer stage and an actual model of the transducer stage.

According to another exemplary aspect, there is provided a method for processing an input signal to a directional sound system, the method comprising: repeatedly equalizing the input signal; and transmitting the equalized input signal; wherein a first equalization of the input signal is performed using an approximated model of the transmission and a second equalization of the input signal comprises compensating for the differences between the approximated model of the transmission and an actual model of the transmission.

Having more than one equalization stage is advantageous as the first equalization stage can provide a coarse equalization of the input signal whereas the second equalization stage can provide a finer equalization of the input signal. In this way, the equalization of the input signal may be performed in a more efficient and accurate manner.

Preferably, the directional sound system further comprises a modulation stage configured to modulate the equalized input signal from the first equalization stage prior to the second equalization stage, wherein the modulation stage employs a modulation technique which uses a pre-distortion term with a variable order. Similarly, the method preferably further comprises modulating the equalized input signal from the first equalization prior to the second equalization by employing a modulation technique which uses a pre-distortion term with a variable order.

It is advantageous to employ the modulation technique which uses a pre-distortion term with a variable order. The addition of the pre-distortion term may reduce distortion in the demodulated signal (i.e. the audio signal output of the directional sound system). The amount of reduction in the distortion is dependent on the order of the pre-distortion term. A higher order will achieve a greater amount of reduction in the distortion. However, a higher order pre-distortion term requires an ultrasonic transducer with a higher bandwidth. By using a pre-distortion term with a variable order, the flexibility of the modulation technique is increased and the order of the pre-distortion term may be varied to suit the requirements of the ultrasonic transducer used in the directional sound system. For example, a lower order may be used for ultrasonic transducers with lower bandwidth whereas the order may be scaled up for ultrasonic transducers with higher bandwidth to further reduce the distortion in the audio signal output of the directional sound system.

Preferably a sub-band approach is employed whereby the input signal is split into a plurality of frequency regions and each frequency region of the input signal is processed independently through at least one stage of the directional sound system.

Using the sub-band approach, the linear nature of the frequency and phase response of the transducer stage within each sub-band may be exploited during equalization. Furthermore, since equalization may be applied to each frequency region independently, the amplitude of the equalized signal in each frequency region will generally not be as low as the amplitude of the equalized signal in the full-band approach and thus, a lower amplification is required for the equalized signal in each frequency region. Furthermore, by using the sub-band approach, the input signal may be downsampled, thus lowering and varying the speed requirement for processing each frequency region and in turn lowering the speed requirement for processing the entire signal. This mixed-rate processing technique thus removes the need for high-end processors and instead, a low cost digital signal processor can be used to implement the directional sound system.

By employing both the sub-band approach and the modulation technique using the pre-distortion term with a variable order, the modulation technique for each frequency region may be adjusted independently. Thus, different components with different requirements (for example, different modulation techniques or different ultrasonic transducers) may be used for different frequency regions and the modulation technique for each frequency region may be adjusted to match the requirements of the components used for that frequency region. Thus, the combination of the flexible modulation technique and the sub-band approach in the embodiments of the present invention is extremely advantageous.

Preferably, the modulation stage comprises a first modulation stage and the directional sound system further comprises: a second modulation stage configured to further modulate the modulated equalized input signal wherein a carrier frequency of the further modulated equalized input signal is dependent on a first carrier frequency in the first modulation stage and a second carrier frequency in the second modulation stage.

Having more than one modulation stage is advantageous as it divides the complexity of the system into more parts and hence, the system can be realized with relatively cheaper hardware such as analog modulators. Furthermore, using more modulation stages offers more flexibility in the selection of the carrier frequency for the modulation of the input signal since the overall carrier frequency may be adjusted by independently adjusting the carrier frequency of each modulation stage.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings.

In the drawings.

DETAILED DESCRIPTION OF THE EXEMPLARY EMBODIMENTS

Figure 1:
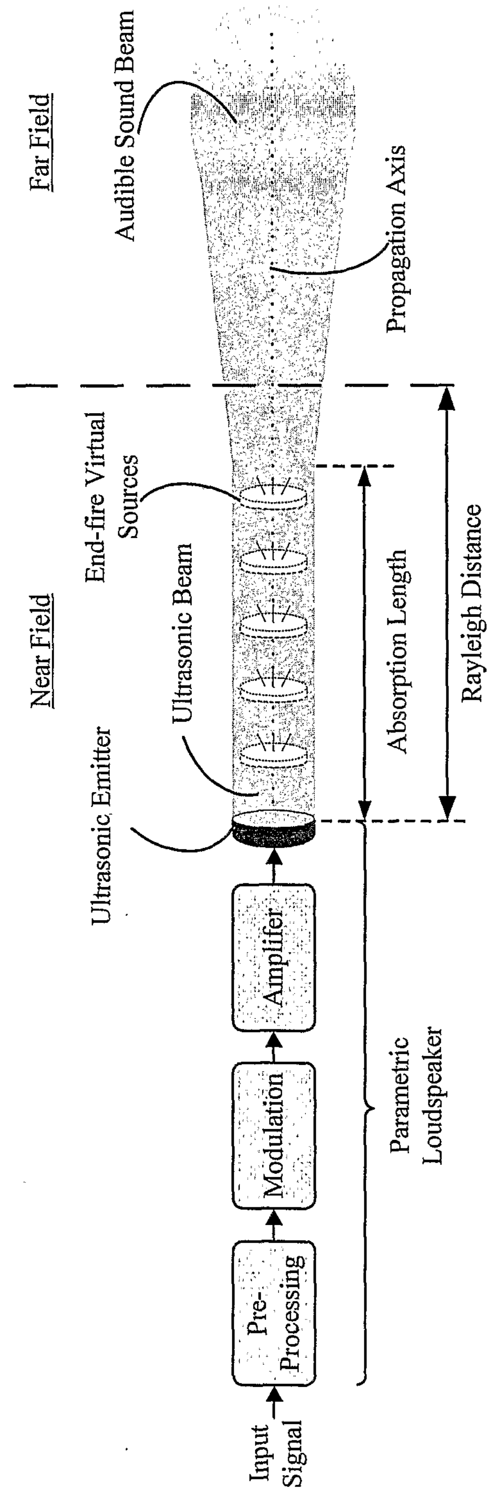
FIG. 1 illustrates a parametric loudspeaker according to a first prior art.
Figure 2:
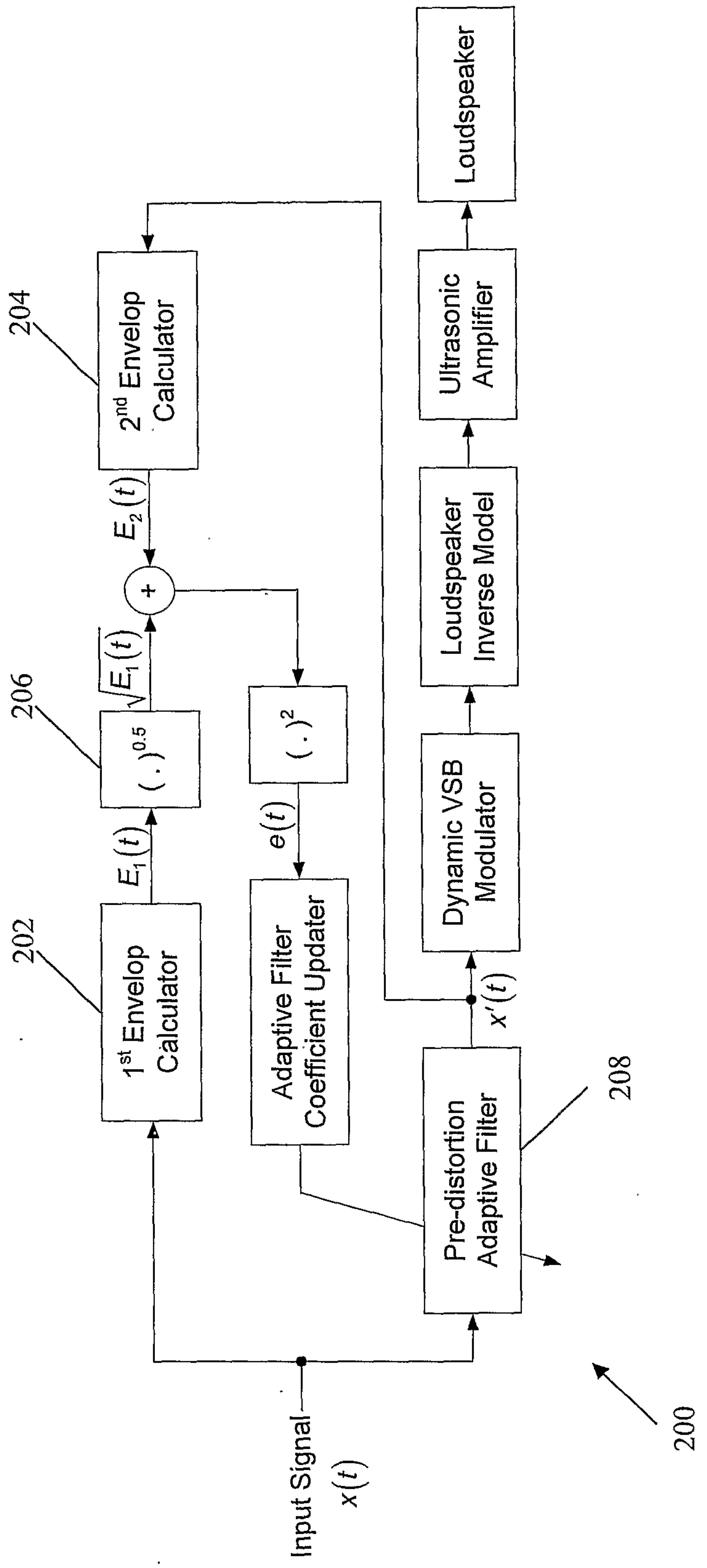
FIG. 2 illustrates an adaptive parametric loudspeaker system according to a second prior art.
Figure 3:
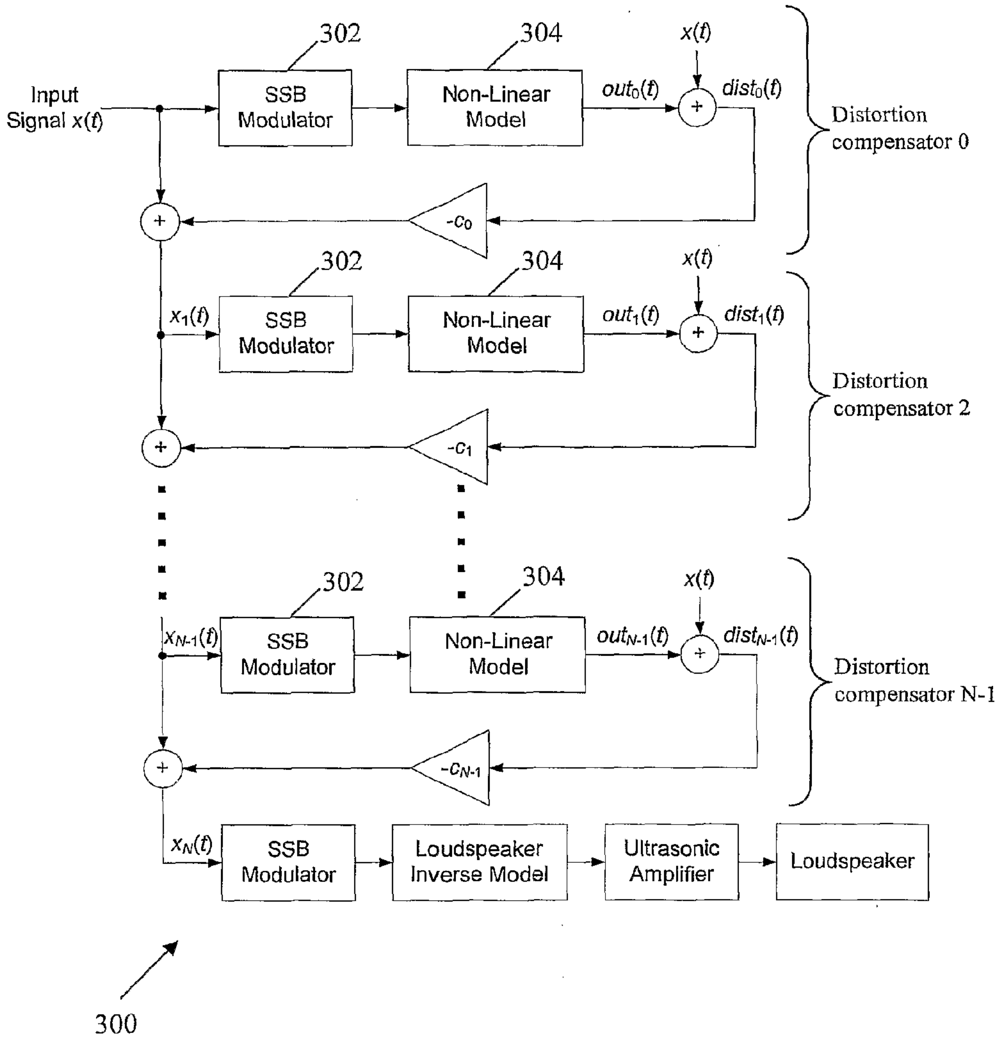
FIG. 3 illustrates a parametric loudspeaker system according to a third prior art.
Figure 4:
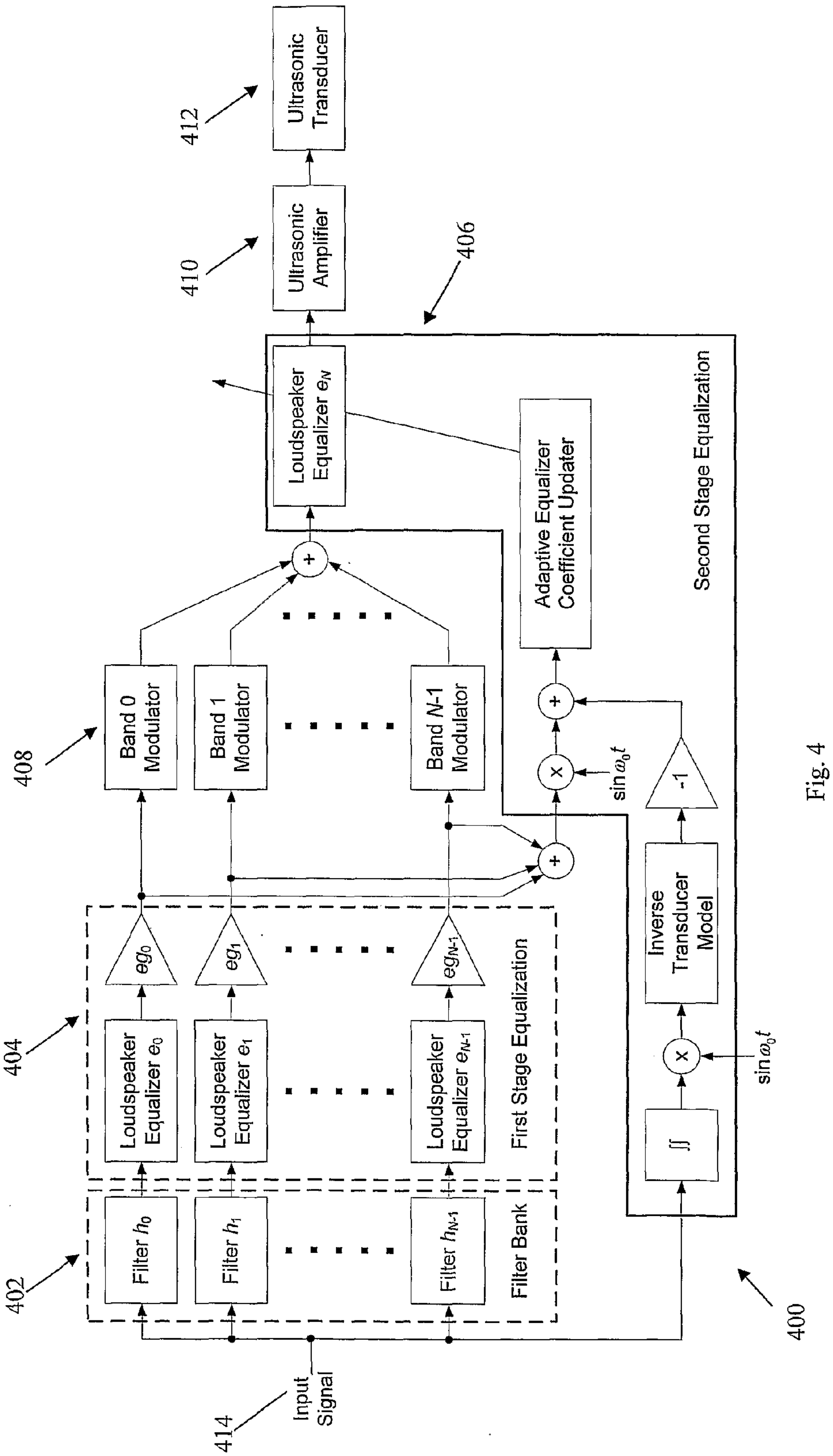
FIG. 4 illustrates a parametric loudspeaker system according to an embodiment of the present invention.

FIG. 4 illustrates a directional sound system in the form of a parametric loudspeaker system 400 according to an embodiment of the present invention.

The input signal 414 of the parametric loudspeaker system 400 is usually an audible sound signal. As shown in FIG. 4, the parametric loudspeaker system 400 comprises a filter bank 402, a first equalization stage 404, a modulation stage 408, and a transducer stage 412 comprising an ultrasonic transducer. The filter bank 402 serves to split the input signal 414 into different frequency regions. In addition, the first equalization stage 404 serves to equalize the input signal 414 whereas the modulation stage 408 serves to modulate the equalized input signal. The transducer stage 412 then serves to transmit the modulated equalized input signal. The parametric loudspeaker system 400 also comprises a second equalization stage 406 for further equalization and an amplification stage 410 comprising an ultrasonic amplifier for amplifying the modulated equalized input signal prior to the transducer stage 412.

To achieve an optimal reduction of distortion in the audible signal produced by the parametric loudspeaker system 400, it is preferable that both the frequency and phase response of the transducer stage 412 are compensated in the equalization stages 404, 406 of the parametric loudspeaker system 400.

The parametric loudspeaker system 400 employs a sub-band approach whereby the input signal is split into a plurality of frequency regions (in other words, a plurality of bands) by the filter bank 402 and each frequency region of the input signal is independently processed through the first equalization stage 404, and the modulation stage 408. Thus, the parametric loudspeaker system 400 may be referred as a “multi-band audio beaming” system.

The different stages of the parametric loudspeaker system 400 will now be described in more detail.

The filter bank 402 serves to split the input signal 414 into different frequency regions. As shown in FIG. 4, the filter bank 402 employs N filters (Filter $h_0, h_1, \ldots h_{N-1}$). Each filter $h_i$ may have a different bandwidth and only frequencies lying within the bandwidth of the filter $h_i$ are allowed through the filter $h_i$.

The first equalization stage 404 serves to compensate for one or more expected changes in the input signal after demodulation. In one example, the first equalization stage 404 serves to compensate for an expected 12 dB/octave slope change in the input signal after demodulation as predicted by the Berktay’s approximation in Equation (1). This change arises due to the second time-derivative in Equation (1). The first equalization stage 404 further serves to compensate for the frequency and phase response of the transducer stage 412 which is usually highly non-linear. As shown in FIG. 4, the first equalization stage 404 comprises a plurality of equalizers (Loudspeaker Equalizers $e_0, e_1, \ldots e_{N-1}$) and gain modules ($eg_0, eg_1, \ldots eg_{N-1}$) with each pair of equalizer $e_i$ and gain module $eg_i$ processing one frequency region of the input signal. In one example, the first equalization stage 404 employs an approximated model of the transducer stage 412 whereby the responses of the plurality of equalizers (Loudspeaker Equalizers $e_0, e_1, \ldots e_{N-1}$) are set based on an inverse of the approximated model. This approximated model may be obtained based on the product specifications of the ultrasonic transducer used in the transducer stage 412.

Figure 5:
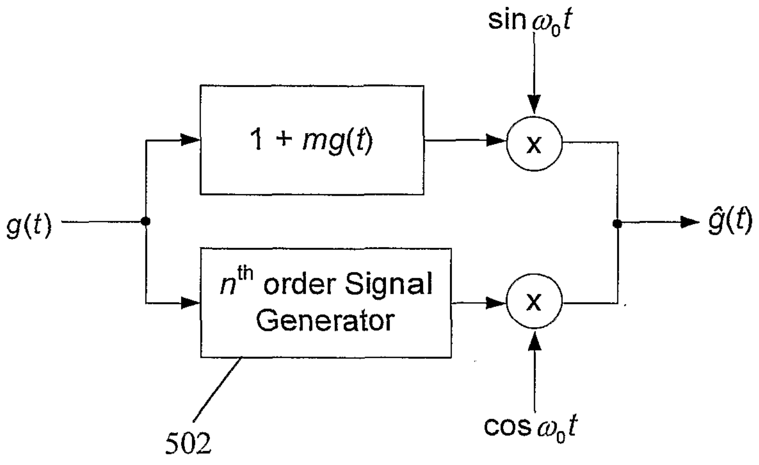
FIG. 5 illustrates a modulation technique employed in a modulation stage of the parametric loudspeaker system of FIG. 4.

The modulation stage 408 employs a modulation technique which uses a pre-distortion term with a variable order as shown in FIG. 5. Equation (5) describes the output $\hat{g}(t)$ of the modulation technique shown in FIG. 5 whereby g(t) is the input to the modulation technique, m is the modulation index and $\omega_0=2\pi f_0$ where $f_0$ is the carrier frequency for the modulation.

$$\begin{aligned}\hat{g}(t) &= (1+mg(t))\sin\omega_0 t + \sum_{i=0}^{q}\frac{(2i)!}{(1-2i)i!^2 4^i}m^{2i}g^{2i}(t)\cos\omega_0 t \\ &= \sqrt{(1+mg(t))^2+\left(\sum_{i=0}^{q}\frac{(2i)!}{(1-2i)i!^2 4^i}m^{2i}g^{2i}(t)\right)^2}\ \sin\left[\omega_0 t+\tan^{-1}\left(\frac{\sum_{i=0}^{q}\frac{(2i)!}{(1-2i)i!^2 4^i}m^{2i}g^{2i}(t)}{1+mg(t)}\right)\right]\end{aligned} \tag{5}$$

As shown in FIG. 5 and Equation (5), the modulation technique works by modulating the input g(t) with a first carrier signal sin $\omega_0$t to produce a main signal (1+mg(t))sin $\omega_0$t, multiplying a pre-distortion term $$\sum_{i=0}^{q}\frac{(2i)!}{(1-2i)i!^2 4^i}m^{2i}g^{2i}(t)$$

with a second carrier signal cos $\omega_0$t to produce a compensation signal, and summing the main signal and the compensation signal to generate the output $\hat{g}$(t). Note that the first and second carrier signals are orthogonal to each other and that the pre-distortion term is generated by the signal generator 502 whereby the order of the signal generator 502 represents the order of the pre-distortion term it generates. From Equation (5), it can be seen that as compared to a typical DSBAM scheme which merely generates the main signal (1+mg(t))sin $\omega_0$t, the output $\hat{g}$(t) comprises an additional orthogonal term $$\sum_{i=0}^{q}\frac{(2i)!}{(1-2i)i!^2 4^i}m^{2i}g^{2i}(t)\cos\omega_0 t.$$

The addition of the pre-distortion term can reduce the distortion in the demodulated signal. This is elaborated below. Denoting $f_1$(t)=1+mg(t) and the output of the signal generator 502 as $f_2$(t), the output $\hat{g}$(t) of the band n modulator can be written in the form as shown in Equation (6).

$$\begin{aligned}\hat{g}(t) &= f_1(t)\sin\omega_0 t + f_2(t)\cos\omega_0 t \\ &= \sqrt{f_1^2(t)+f_2^2(t)}\,\sin[\omega_0 t + \tan^{-1}(f_2(t)/f_1(t))]\end{aligned} \quad (6)$$

In other words, the envelope of the modulation technique output $\hat{g}$(t) is $\sqrt{f_1^2(t)+f_2^2(t)}$. According to the Berktay's approximation (Equation (1)), the demodulated signal (or audible difference frequency) pressure $p_2$(t) along the axis of propagation is proportional to the second time-derivative of the square of the envelope of the modulated signal. Substituting $\sqrt{f_1^2(t)+f_2^2(t)}$ into Equation (1), Equation (7) is obtained as follows.

$$p_2(t) \approx \frac{\beta P_0^2 a^2}{16\rho_0 c_0^4 z\alpha_0}\frac{d^2}{dt^2}E^2(t) = \frac{\beta P_0^2 a^2}{16\rho_0 c_0^4 z\alpha_0}\frac{d^2}{dt^2}\left(\sqrt{f_1^2(t)+f_2^2(t)}\right)^2 \quad (7)$$

Setting $f_2(t)=\sqrt{1-m^2g^2(t)}$, Equation (7) can be written as:

$$p_2(t) \approx \frac{2m\beta P_0^2 a^2}{16\rho_0 c_0^4 z\alpha_0}\frac{d^2}{dt^2}(g(t)) \propto \frac{d^2}{dt^2}(g(t)) \quad (8)$$

As shown in Equation (8), by setting $f_2(t)=\sqrt{1-m^2g^2(t)}$, the demodulated signal becomes proportional to the input signal g(t). In other words, the distortion in the demodulated signal is completely removed. However, this is only true if and only if the ultrasonic transducer 412 has infinite bandwidth. As this is not the case with practical ultrasonic transducers, the pre-distortion term $f_2(t)=\sqrt{1-m^2g^2(t)}$ is approximated using its truncated Taylor series $$\sum_{i=0}^{q}\frac{(2i)!}{(1-2i)i!^2 4^i}m^{2i}g^{2i}(t).$$

By adjusting the value of q, the order of the pre-distortion term $$\sum_{i=0}^{q}\frac{(2i)!}{(1-2i)i!^2 4^i}m^{2i}g^{2i}(t)$$

can be varied.

In the parametric loudspeaker system 400, the modulation stage 408 comprises a plurality of band n modulators with each band n modulator employing the modulation technique of FIG. 5. It is possible to adjust the order q of the pre-distortion term in each band n modulator independently. In one example, the order q of the pre-distortion term for each band n modulator is selected according to a bandwidth of the filter $h_n$ in the filter bank 402 operably connected to the modulator. In this example, the order q is selected to be higher if the bandwidth of the respective filter of the filter bank 402 is larger.

The frequency spectrum of the ultrasonic transducer in the transducer stage 412 is generally non-symmetrical about its resonance frequency. The second equalization stage 406 serves to compensate for this. The second equalization stage 406 further serves to compensate for the differences between an actual model of the transducer stage 412 and the approximated model of the transducer stage 412 used in the first equalization stage 404. The actual model of the transducer stage 412 may be obtained through experimentation.

As shown in FIG. 4, the second equalization stage 406 employs an adaptive filter (Loudspeaker Equalizer $e_N$). This adaptive filter is trained with a LMS algorithm using the difference between a first signal and a second signal. As shown in FIG. 4, the first signal is obtained by double integrating the input signal 414 and processing this double integrated signal through an inverse of the actual model of the transducer stage 412 (i.e. "inverse transducer model") whereas the second signal is obtained using the equalized signal from the first equalization stage 404. In system 400, the double-integrated signal and the equalized signal are modulated by sin $\omega_0$t to match the resonance frequency of the ultrasonic transducer in the transducer stage 412. This resonance frequency is typically in the ultrasonic range. Thus, by adaptively tuning the Loudspeaker Equalizer $e_N$ using the LMS algorithm, the second equalization stage 406 can achieve equalization of the non-symmetrical response of the ultrasonic transducer and at the same time, compensate for the differences between the actual model of the transducer stage 412 and the approximated model of the transducer stage 412.

Figure 6:
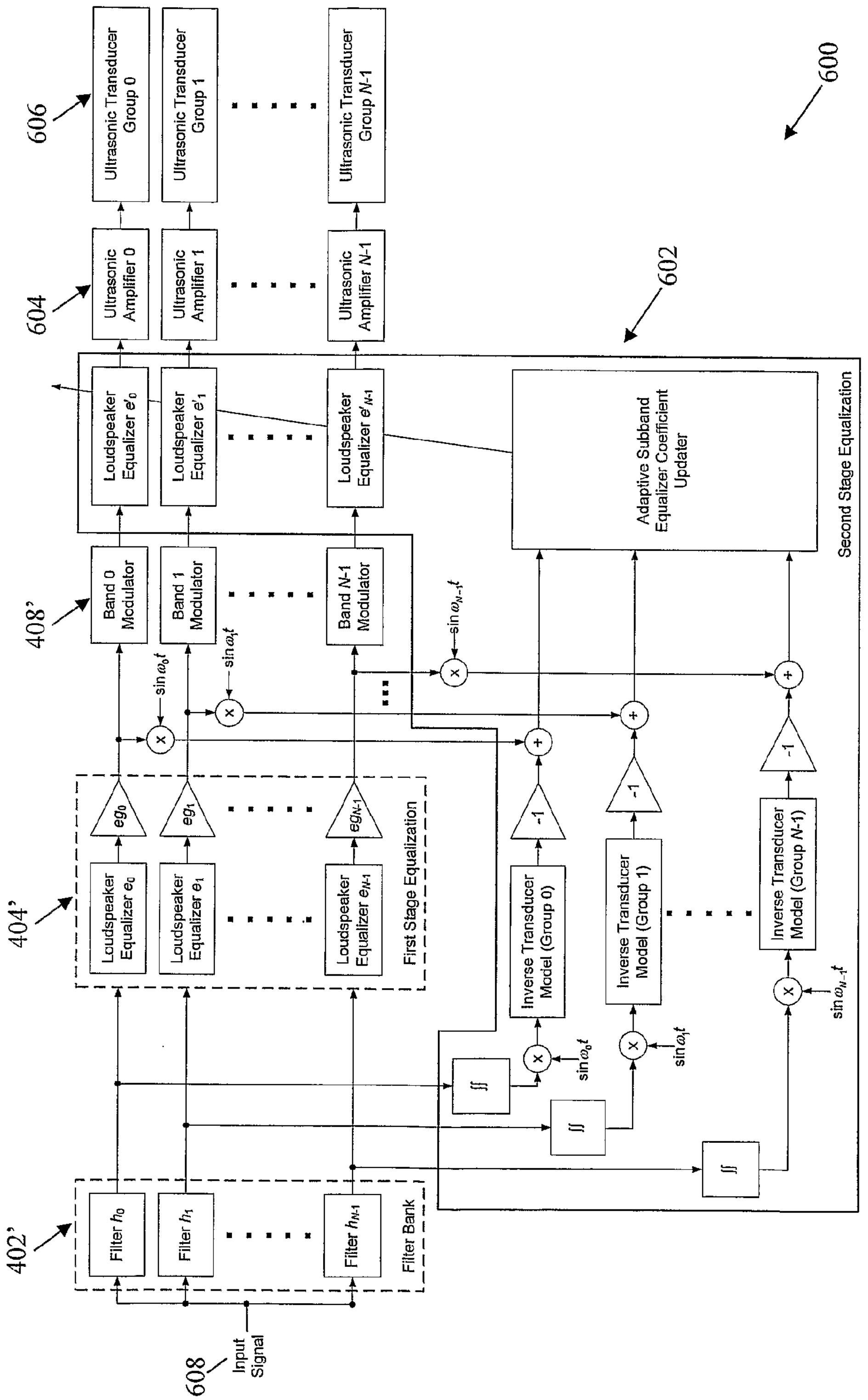
FIG. 6 illustrates a parametric loudspeaker system which is a first variation of the parametric loudspeaker system of FIG. 4.

FIG. 6 illustrates a parametric loudspeaker system 600 which is a first variation of the parametric loudspeaker system 400. The filter bank 402', the first equalization stage 404' and the modulation stage 408' of the parametric loudspeaker system 600 are identical to that of the parametric loudspeaker system 400 and thus, these parts have the same reference numerals with the addition of prime.

As shown in FIG. 6, instead of having only a single adaptive filter (Loudspeaker Equalizer $e_N$), the second equalization stage 602 of the parametric loudspeaker system 600 comprises a plurality of adaptive filters (N Loudspeaker Equalizers $e'_0, e'_1, \ldots e'_{N-1}$) with each adaptive filter $e'_i$ trained using a corresponding inverse transducer model (Group i). Furthermore, as opposed to having only a single ultrasonic amplifier and a single ultrasonic transducer, the amplification stage 604 of the parametric loudspeaker system 600 comprises a plurality of ultrasonic amplifiers (Ultrasonic Amplifier 0, 1, . . . , N−1) whereas the transducer stage 606 of the parametric loudspeaker system 600 comprises a plurality of ultrasonic transducers (Ultrasonic Transducer Group 0, 1, . . . , N−1). Each band n modulator in the modulation stage 408' is operably connected to a filter $h_n$ in the filter bank 402' and an ultrasonic transducer (Ultrasonic Transducer Group n) in the transducer stage 606. Similarly, the frequency spectrum of each ultrasonic transducer in the transducer stage 606 may be non-symmetrical about its resonance frequency and the second equalization stage 602 serves to compensate for this by tuning each of the loudspeaker equalizers (N Loudspeaker Equalizers $e'_0, e'_1, \ldots e'_{N-1}$) to match the respective ultrasonic transducer.

The parametric loudspeaker system 600 extends the sub-band approach to the second equalization stage 602, the amplification stage 604 and the transducer stage 606. In the parametric loudspeaker system 600, the input signal 608 is first split into different frequency regions using the filter bank 402' and each frequency region of the input signal 608 is independently processed through the two equalization stages 404', 602, the modulation stage 408', the amplification stage 604 and the transducer stage 606. Such a structure allows the usage of different types of emitters in different ultrasonic transducers for different frequency regions. Different types of emitters may have different bandwidth or amplification requirements and the output of each band n modulator of the modulation stage 408' may be independently adjusted to match the requirements of the respective ultrasonic transducer (Ultrasonic Transducer Group n) operably connected to it. The output of each band n modulator may also be independently adjusted according to the bandwidth of the filter $h_n$ in the filter bank 402' operably connected to it.

For example, each band n modulator may employ the modulation technique as shown in FIG. 5 and the order q of the pre-distortion term for each band n modulator may be selected based on a bandwidth of the corresponding filter $h_n$ in the filter bank 402' and a bandwidth of the corresponding ultrasonic transducer (Ultrasonic Transducer Group n). Furthermore, each band n modulator in the modulation stage 408' may use a different carrier frequency (i.e. a different $\omega_0$ as shown in FIG. 5) such that the carrier frequency for each modulator matches the resonance frequency of the respective ultrasonic transducer (Ultrasonic Transducer Group n). Furthermore, instead of the modulation technique shown in FIG. 5, some modulators may apply other modulation techniques which are more suited to the respective ultrasonic transducers. This can achieve a lower distortion in the demodulated signal.

Figure 7:
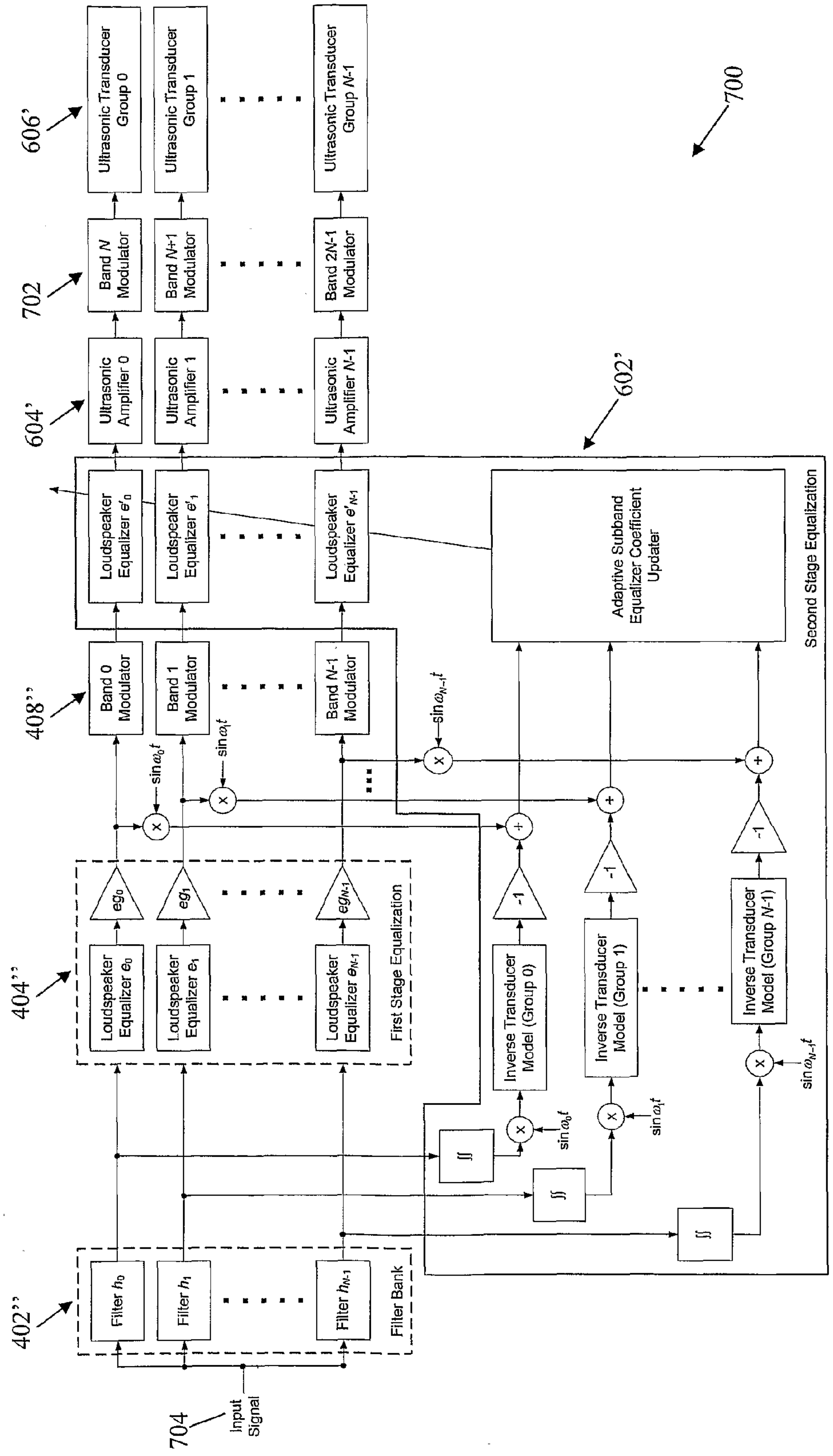
FIG. 7 illustrates a parametric loudspeaker system which is a second variation of the parametric loudspeaker system of FIG. 4.

FIG. 7 illustrates a parametric loudspeaker system 700 which is a second variation of the parametric loudspeaker system 400. The parametric loudspeaker system 700 is similar to the parametric loudspeaker system 600 and thus, the same parts will have the same reference numerals with the addition of prime.

As shown in FIG. 7, the parametric loudspeaker system 700 not only comprises a first modulation stage 408", it further comprises a second modulation stage 702 for further modulating the modulated signal. In FIG. 7, each frequency region of the input signal is independently processed through the first and second modulation stages 408", 702. The carrier frequency of the further modulated signal is dependent on a first carrier frequency in the first modulation stage 408" and a second carrier frequency in the second modulation stage 702. Similar to the first modulation stage 408", the second modulation stage 702 also comprises a plurality of modulators (Band N Modulator, Band N+1 Modulator . . . Band 2N−1 Modulator) and the output of each modulator may be independently adjusted to match the requirements of the ultrasonic transducer operably connected to it. The output of each modulator may also be independently adjusted according to the bandwidth of the filter $h_n$ of the filter bank 402" operably connected to it.

Having more than one modulation stage is advantageous. In the case where there is only a single modulation stage, it is necessary to sample the input signal at a high sampling frequency if the input signal is to be modulated with a high carrier frequency. By providing an additional modulation stage, the carrier frequency in each modulation stage can be lowered without lowering the overall carrier frequency. Thus, the sampling frequency of the input signal may be lowered and the computational requirement for processing the input signal may be reduced. Furthermore, having two modulation stages 408", 702 divides the complexity of the system 700 into two parts and hence, the system 700 can be realized with relatively cheaper hardware such as analog modulators. For example, users may implement the first modulation stage 408" on a readily available computer despite its low sampling frequency since the overall carrier frequency may be increased using the second modulation stage 702 which may be implemented on, for example, inexpensive analog modulators external to the computer.

Furthermore, using the additional modulation stage 702 offers more flexibility in the selection of the carrier frequency for the modulation of the input signal since the overall carrier frequency may be adjusted by adjusting either the first carrier frequency in the first modulation stage 408" or the second carrier frequency in the second modulation stage 702, or both of these carrier frequencies. This is particularly useful in the sub-band approach especially when the ultrasonic transducers used for different frequency regions have different resonance frequencies.

Other variations of the parametric loudspeaker system 400 may also be possible.

For example, a full-band approach may be adopted for any of the above embodiments whereby the input signal is processed as a whole through all the stages of the parametric loudspeaker system. In one example, the parametric loudspeaker system comprises a single modulator in the modulation stage and a single ultrasonic transducer in the transducer stage. The single modulator may employ the modulation technique as shown in FIG. 5 with the order q selected based on the frequency range (i.e. bandwidth) of the input signal and the bandwidth of the single ultrasonic transducer. Thus, even with only a single modulator, the modulator can still be adapted to different types of ultrasonic transducers with different frequency responses. This helps in reproducing directional sound with minimum distortion. However, the sub-band approach is still preferable since by using several band n modulators employing the modulation technique in FIG. 5, the order q for each band n modulator can be adjusted separately and thus, a higher reduction of distortion can be achieved.

Alternatively, the parametric loudspeaker system may comprise a plurality of adaptive filters in the second equalization stage and only a single ultrasonic transducer in the transducer stage. In another example, the parametric loudspeaker system may comprise a single adaptive filter in the second equalization stage and a plurality of ultrasonic transducers in the transducer stage. However, this example is not preferable.

Furthermore, the filter bank and first equalization stage of the parametric loudspeaker system 400, 600, 700 may be combined into a single equalization stage whereby the single equalization stage serves to split the input signal into different frequency regions, compensate for one or more expected changes in the input signal after demodulation and at the same time, compensate for the frequency and phase response of the transducer stage. In addition, the parametric system may comprise more than two equalization stages and may also comprise more than two modulation stages. Each of these modulation stages may or may not employ the modulation technique of FIG. 5. In one example, only some modulators in any one modulation stage employ the modulation technique of FIG. 5.

The advantages of the embodiments of the present invention are as follows.

Preprocessing methods to reduce the distortion in parametric loudspeakers have previously been suggested. However, these preprocessing methods are based on a single-band approach, whereby a single pre-processing method and modulation technique is applied to the entire frequency range of the signal. Also, there is hardly any mention on the types of ultrasonic emitters used with these preprocessing methods. Through experiment, the inventors of this application found that different ultrasonic emitters have very different frequency responses that need to be individually addressed in order to best reproduce directional sound with minimum distortion. The embodiments of the present invention can address both the single-band problem and the problem arising due to the difference in the frequency responses of different ultrasonic emitters. An adaptive approach is also incorporated in the embodiments to compensate for the deficiency in the ultrasonic emitters.

In the embodiments of the present invention, the modulation stage employs a modulation technique known as Modified Amplitude Modulation q (MAMq) which uses a pre-distortion term with a variable order. In this modulation technique, an orthogonal term (formed by multiplying a pre-distortion term with an orthogonal carrier signal) is added to the usual DSBAM scheme. This is different from the typical amplitude-based modulation techniques used in the prior art.

Figure 8:
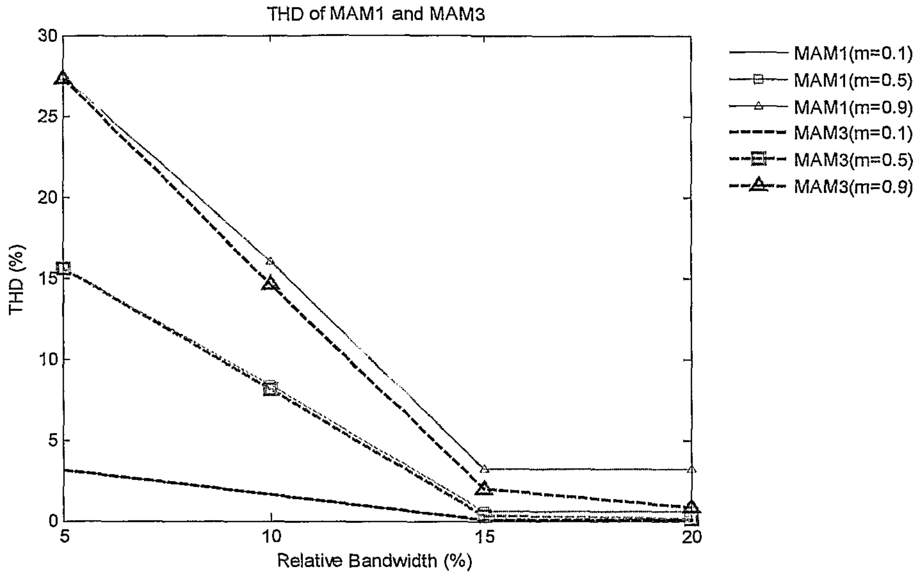
FIG. 8 illustrates the Total Harmonic Distortion performance of the modulation technique of FIG. 5.

FIG. 8 shows the Total Harmonic Distortion (THD) performance of MAMq schemes, in particular, MAM1 (i.e. q=1) and MAM3 (i.e. q=3). Note that the order q may be greater than 3. However, the THD performance of the MAMq scheme is not expected to increase significantly with higher orders (q>3). As shown in FIG. 8, for a given value of q, the THD performance of the MAMq scheme is dependent on the available bandwidth of the ultrasonic emitter and the modulation index m. As the relative bandwidth (i.e. absolute bandwidth divided by center frequency) of the ultrasonic emitter increases, the THD values achieved by the MAMq scheme reduces rapidly with the rate of reduction in THD values decreasing as the relative bandwidth increases beyond 10%. This indicates that the MAMq scheme works well even for ultrasonic emitters with low relative bandwidth. Furthermore, not only does the MAMq scheme achieve low THD values, it also has the flexibility of scaling up its order q to further reduce the THD values for wider bandwidth ultrasonic emitters.

Thus, the addition of the pre-distortion term can greatly reduce distortion in the demodulated signal (i.e. the audio signal output of the parametric loudspeaker system). As shown in FIG. 8, the amount of reduction in the distortion is dependent on the order of the pre-distortion term. A higher order will achieve a greater amount of reduction in the distortion. However, a higher order pre-distortion term requires an ultrasonic transducer with a higher bandwidth. By using a pre-distortion term with a variable order, the flexibility of the modulation technique is increased and the order of the pre-distortion term may be varied to suit the requirements of the ultrasonic transducer used in the parametric loudspeaker system. For example, a lower order may be used for ultrasonic transducers with lower bandwidth whereas the order may be scaled up for ultrasonic transducers with higher bandwidth to further reduce the distortion in the audio signal output of the parametric loudspeaker system.

Furthermore, the embodiments of the present invention use a sub-band approach. Unlike the conventional fullband approach, the embodiments of the present invention are able to solve the problems in a more detailed manner by partitioning the input signal into smaller frequency regions (or bands) and using a "divide-and-conquer" approach to reduce the distortion found in these smaller regions. As such, different algorithms may be used to remove the distortion found in different frequency regions, thereby enhancing the quality of the audio sound produced by the parametric loudspeaker system.

Using the sub-band approach, the embodiments of the present invention can exploit the linear nature of the frequency and phase response of the transducer stage within each subband. Thus, as compared to the non-subband (i.e. fullband) approach, the compensation for the frequency and phase response of the transducer stage is simplified using the embodiments of the present invention.

The amplitude of the input signal may be higher in certain frequency regions whereas it may be lower in other frequency regions. Typically, equalization is achieved by lowering the amplitude of the input signal in high amplitude frequency regions to match the amplitude of the input signal in the lowest amplitude frequency region (i.e. the frequency region in which the amplitude of the input signal is the lowest). In order to compensate for the reduction in the signal level, the signal is amplified after equalization. This is highly undesirable due to the low efficiency in electrical to acoustic conversion in ultrasonic transducers. The sub-band approach in the embodiments of the present invention avoids these issues arising in typical full-band equalization. Using the sub-band approach, the equalization is applied to each frequency region independently and therefore the amplitude of the equalized signal in each frequency region will generally not be as low as the amplitude of the equalized signal in the full-band approach. Thus, a lower amplification is required for the equalized signal in each frequency region.

It can be shown that the embodiments of the present invention using the sub-band approach provide a significant reduction in harmonic distortion and in the intermodulation distortion as compared to the traditional full-band approach. Furthermore, by using the sub-band approach, the input signal may be downsampled, thus lowering and varying the speed requirement for processing each frequency region and in turn lowering the speed requirement for processing the entire signal. This mixed-rate processing technique thus removes the need for high-end processors and instead, a low cost digital signal processor can be used to implement the multi-band Audio Beaming System in the embodiments of the present invention. Also, although ultrasonic transducers with higher bandwidth are more desirable, they are usually more expensive. The sub-band approach allows the use of different types of ultrasonic transducers in the same system, thus allowing the use of cheaper ultrasonic transducers with lower bandwidth for input frequencies which are less important. This in turn lowers the cost of the system.

Furthermore, there is flexibility in the implementation of the embodiments in the present invention. For example, different variations of the parametric loudspeaker system 400 are possible. The embodiments of the present invention can also be scaled, for example by the manufacturer, to fit the required applications. The pricing of the system may also vary according to the scaling. Thus, the products can be differentiated.

In addition, in the embodiments of the present invention, two or more modulation stages may be provided. This allows the embodiments to be realized with relatively cheaper hardware such as analog modulators. This also offers more flexibility in the selection of the carrier frequency for the modulation of the input signal since the overall carrier frequency may be adjusted by independently adjusting the carrier frequency in each modulation stage.

Also, two or more equalization stages may be provided in the embodiments of the present invention. This is advantageous as the initial equalization stages can implement a coarser equalization of the input signal whereas the later equalization stages can implement a finer equalization of the input signal. In this way, equalization of the input signal is performed in a more efficient and accurate manner.

The embodiments of the present invention thus provide a comprehensive approach in reducing distortion in a parametric array. There are several commercial applications that can be achieved using the embodiments of the present invention. Some of these applications include (a) delivering private messages in a museum, billboard, art gallery, restaurant etc., (b) multi-lingual teleconferencing and messaging, (c) creating new binaural and three-dimensional effects in gaming and home entertainment, (d) directional loud hailer and (e) personal tune-in zone.

In summary, (i) Through the use of a pre-distortion term with a variable order, the embodiments of the present invention provide the ability to step up or step down the order of the modulation technique to suit different types or different bandwidths of ultrasonic emitters (or transducers). Furthermore, by using the subband approach, the order of the modulation technique can be tuned based on the need in each frequency region.

(ii) The embodiments of the present invention provide the ability to apply a more relevant or direct pre-processing scheme for each frequency region of the input signal, thus providing a multi-band distortion reduction approach for audio beaming.

(iii) The embodiments of the present invention provide the capability to match the bandwidth of the ultrasonic transducer to achieve low distortion.

(iv) The embodiments of the present invention provide subband based equalization of the frequency and phase response of the transducer stage. In contrast to the full-band approach, this avoids the problem of severely reducing the output sound level of parametric loudspeakers when implementing equalization (v) The embodiments of the present invention achieve efficient computational complexity (vi) The embodiments of the present invention achieve flexibility and may be implemented at a lower cost through the use of multiple modulation stages (vii) By incorporating an adaptive algorithm into the embodiments of the present invention, the deficiencies found in different types of ultrasonic transducers in the parametric loudspeaker systems can be better compensated for. Furthermore, by having more than one equalization stage, the efficiency and accuracy of the equalization process can be enhanced.

Whilst the foregoing description has described exemplary embodiments, it will be understood by those skilled in the technology concerned that many variations in details of design, construction and/or operation may be made without departing from the present invention.

The invention claimed is:

1. A directional sound system comprising:
- a plurality of equalization stages configured to equalize an input signal;
- a transducer stage configured to transmit the equalized input signal; and
- a modulation stage configured to modulate the equalized input signal from the first equalization stage prior to the second equalization stage;
- wherein the plurality of equalization stages comprises a first equalization stage configured to employ an approximated model of the transducer stage and a second equalization stage configured to compensate for differences between the approximated model of the transducer stage and an actual model of the transducer stage;
- wherein the input signal is split into a plurality of frequency regions and each frequency region of the input signal is processed independently through the first equalization stage and the modulation stage.

2. A directional sound system according to claim 1, wherein the modulation stage employs a modulation technique which uses a pre-distortion term with a variable order.

3. A directional sound system according to claim 2, wherein the modulation technique comprises:
- modulating an input to the modulation technique with a first carrier signal to produce a main signal;
- multiplying the pre-distortion term with a second carrier signal orthogonal to the first carrier signal to produce a compensation signal; and
- summing the main signal and the compensation signal to generate an output of the modulation technique.

4. A directional sound system according to claim 2, wherein the first equalization stage is further configured to compensate for one or more expected changes in the input signal after demodulation and to compensate for the frequency and phase response of the transducer stage, wherein the first equalization stage is configured to compensate for an expected 12 dB/octave slope change in the input signal after demodulation.

5. A directional sound system according to claim 2, wherein the second equalization stage comprises at least one adaptive filter, wherein in use the at least one adaptive filter is trained with a least mean square algorithm using a difference between a first signal and a second signal;
- wherein the first signal is obtainable by double integrating the input signal and processing the double integrated signal through an inverse of the actual model of the transducer stage and the second signal is obtainable using the equalized input signal from the first equalization stage.

6. A directional sound system according to claim 2, wherein the directional sound system further comprises an amplification stage for amplifying the equalized input signal prior to the transducer stage.

7. A directional sound system according to claim 2, wherein the transducer stage comprises an ultrasonic transducer, and the order of the pre-distortion term for the modulation technique is selected based on a bandwidth of the input signal and a bandwidth of the ultrasonic transducer, wherein a frequency response of the ultrasonic transducer is non-symmetrical and the second equalization stage is further configured to compensate for the non-symmetrical frequency response of the ultrasonic transducer.

8. A directional sound system according to claim 2, wherein the input signal is able to be split into a plurality of frequency regions using a plurality of filters in a filter bank and the modulation stage comprises a plurality of modulators with each modulator operably connected to each filter in the filter bank; and wherein at least one modulator is configured to employ the modulation technique with the order of the pre-distortion term for each of the at least one modulator selected based on a bandwidth of the filter operably connected to the modulator, wherein each frequency region of the input signal is able to be processed independently through the first and second equalization stages, wherein the transducer stage comprises a plurality of ultrasonic transducers, each ultrasonic transducer operably connected to a filter of the filter bank and a modulator of the modulation stage; and wherein at least one modulator is configured to employ the modulation technique with the order of the pre-distortion term for each of the at least one modulator selected based on a bandwidth of the filter operably connected to the modulator and a bandwidth of the ultrasonic transducer operably connected to the modulator.

9. A directional sound system according to claim 2, wherein the modulation stage comprises a first modulation stage and the directional sound system further comprises:

a second modulation stage configured to further modulate the equalized input signal prior to the transducer stage wherein a carrier frequency of the further modulated equalized input signal is dependent on a first carrier frequency in the first modulation stage and a second carrier frequency in the second modulation stage.

10. A directional sound system according to claim 9, wherein the input signal is able to be split into a plurality of frequency regions and each frequency region of the input signal is able to be processed independently through the first and second modulation stages.

11. A method for processing an input signal to a directional sound system, the method comprising:

repeatedly equalizing the input signal; and transmitting the equalized input signal;

wherein a first equalization of the input signal is performed using an approximated model of the transmission and a second equalization of the input signal comprises compensating for the differences between the approximated model of the transmission and an actual model of the transmission;

wherein the method further comprises splitting the input signal into a plurality of frequency regions prior to repeatedly equalizing the input signal, and modulating the equalized input signal from the first equalization prior to the second equalization;

wherein modulating the equalized input signal further comprises modulating the equalized input signal for each frequency region of the input signal independently.

12. A method according to claim 11, wherein the method further comprises by employing a modulation technique which uses a pre-distortion term with a variable order.

13. A method according to claim 12, wherein the modulation technique comprises:

modulating an input to the modulation technique with a first carrier signal to produce a main signal;

multiplying the pre-distortion term with a second carrier signal orthogonal to the first carrier signal to produce a compensation signal; and summing the main signal and the compensation signal to generate an output of the modulation technique.

14. A method according to claim 12, wherein the transmission is characterized by a frequency and phase response and wherein repeatedly equalizing the input signal further comprises:

compensating for one or more expected changes in the input signal after demodulation; and compensating for the frequency and phase response of the transmission, wherein compensating for one or more expected changes in the input signal after demodulation further comprises compensating for an expected 12 dB/octave slope change in the input signal after demodulation.

15. A method according to claim 12, wherein compensating for the differences between the approximated model of the transmission and the actual model of the transmission is performed adaptively, wherein the adaptive compensation for the differences between the approximated model of the transmission and the actual model of the transmission is performed with a least mean square algorithm using a difference between a first signal and a second signal;

wherein the first signal is obtained by double integrating the input signal and processing the double integrated signal through an inverse of the actual model of the transmission and the second signal is obtained using the equalized input signal from the first equalization.

16. A method according to claim 12, further comprising amplifying the equalized input signal prior to the transmission.

17. A method according to claim 12, wherein the equalized input signal is transmitted using an ultrasonic transducer and the order of the pre-distortion term for the modulation technique is selected based on a bandwidth of the input signal and a bandwidth of the ultrasonic transducer, wherein a frequency response of the ultrasonic transducer is non-symmetrical and the method further comprises compensating for the non-symmetrical frequency response of the ultrasonic transducer.

18. A method according to claim 12, wherein the input signal is split into a plurality of frequency regions using a plurality of filters in a filter bank and for at least one frequency region, the modulation technique is employed with the order of the pre-distortion term selected based on a bandwidth of the respective filter of the filter bank.

19. A method according to claim 18, wherein the modulated equalized signal for each frequency region is transmitted using an ultrasonic transducer; and for at least one frequency region, the modulation technique is employed with the order of the pre-distortion term selected based on a bandwidth of the respective filter of the filter bank and a bandwidth of the respective ultrasonic transducer.

20. A method according to claim 12, further comprising further modulating the modulated equalized input signal prior to transmitting the equalized input signal wherein a carrier frequency of the further modulated equalized input signal is dependent on a first carrier frequency of the initial modulation and a second carrier frequency of the further modulation;

wherein each frequency region of the input signal is processed independently in at least one equalization of the input signal.

* * * * *